(12) United States Patent
Buddhiraju et al.

(10) Patent No.: US 11,928,225 B2
(45) Date of Patent: *Mar. 12, 2024

(54) SYSTEM FOR IMPLEMENTING REAL-TIME REDACTION IN A WORKFLOW CONFIGURABLE ENVIRONMENT

(71) Applicant: BANK OF AMERICA CORPORATION, Charlotte, NC (US)

(72) Inventors: Nagaraju Buddhiraju, Moorpark, CA (US); Deepali Dadhich, Westlake Village, CA (US); Lekshan Bhathiya Jayasinghe, Frisco, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,425

(22) Filed: Jun. 1, 2023

(65) Prior Publication Data
US 2023/0306124 A1    Sep. 28, 2023

Related U.S. Application Data

(63) Continuation of application No. 17/499,466, filed on Oct. 12, 2021, now Pat. No. 11,704,417.

(51) Int. Cl.
*G06F 21/60* (2013.01)
*G06F 21/62* (2013.01)

(52) U.S. Cl.
CPC .......... *G06F 21/604* (2013.01); *G06F 21/629* (2013.01); *G06F 2221/2141* (2013.01)

(58) Field of Classification Search
USPC .......................................................... 726/27
See application file for complete search history.

(56) References Cited

U.S. PATENT DOCUMENTS

| | | | |
|---|---|---|---|
| 7,917,770 B2 * | 3/2011 | Gopinath | G06F 11/3672 |
| | | | 713/189 |
| 8,341,104 B2 | 12/2012 | Manickam | |
| 8,856,748 B1 | 10/2014 | Larsen | |
| 8,893,290 B2 * | 11/2014 | Piratla | G06F 21/60 |
| | | | 713/153 |
| 9,152,219 B2 | 10/2015 | Dai | |
| 9,558,031 B2 | 1/2017 | Cismas | |

(Continued)

*Primary Examiner* — Sanchit K Sarker
(74) *Attorney, Agent, or Firm* — Moore & Van Allen PLLC; Anup Shrinivasan Iyer

(57) ABSTRACT

Systems, computer program products, and methods are described herein for implementing real-time redaction in a workflow configurable environment. The present invention is configured to electronically receive, from a user input device, a request to load at least one user interface associated with an application; initiate a real-time content redaction engine on contents of the one or more fields associated with the at least one user interface in response to receiving the request, wherein initiating further comprises: parsing one or more embedded structures associated with the one or more fields; identifying private information in the one or more fields based on at least parsing the one or more embedded structures; and masking the private information in the one or more fields; and load the at least one user interface associated with the application in response to masking the private information in the one or more fields.

17 Claims, 3 Drawing Sheets

(56) References Cited

U.S. PATENT DOCUMENTS

| | | |
|---|---|---|
| 9,772,873 B2 | 9/2017 | Kurian |
| 9,910,663 B1 | 3/2018 | Biear |
| 9,952,953 B2 | 4/2018 | Payette |
| 10,282,667 B2 | 5/2019 | Gagne |
| 10,310,723 B2 | 6/2019 | Rathod |
| 10,503,367 B2 | 12/2019 | Rodgers |
| 10,528,327 B2 | 1/2020 | Kumar |
| 10,621,013 B2 | 4/2020 | Lavoie |
| 10,643,212 B2 | 5/2020 | Pender |
| 10,666,654 B2 | 5/2020 | Pender |
| 10,846,153 B2 | 11/2020 | Balasubramanian |
| 10,867,209 B2 | 12/2020 | Coven |
| 10,942,960 B2 | 3/2021 | Oliner |
| 11,012,466 B2 | 5/2021 | Gilmore |
| 11,106,492 B2 * | 8/2021 | Shanmugam ........... H04W 4/50 |
| 2006/0085761 A1 | 4/2006 | Allen |
| 2013/0004090 A1 * | 1/2013 | Kundu .................. G06Q 20/20 |
| | | 382/284 |
| 2017/0206483 A1 | 7/2017 | Fable |
| 2019/0012188 A1 | 1/2019 | Harrison |
| 2019/0095644 A1 * | 3/2019 | Park ....................... G05B 15/02 |
| 2019/0108044 A1 * | 4/2019 | Coven ................... G06F 9/5027 |
| 2019/0138635 A1 | 5/2019 | Givon |
| 2023/0090108 A1 * | 3/2023 | Ciabarra, Jr. ......... H04L 67/535 |
| | | 726/26 |

\* cited by examiner

SYSTEM FOR IMPLEMENTING REAL-TIME REDACTION IN A WORKFLOW CONFIGURABLE ENVIRONMENT

CROSS-REFERENCE TO RELATED APPLICATION

The present application is a continuation application of and claims priority to U.S. patent application Ser. No. 17/499,466 filed Oct. 12, 2021 of the same title; the contents of which are also incorporated by reference herein.

FIELD OF THE INVENTION

The present invention embraces a system for implementing real-time redaction in a workflow configurable environment.

BACKGROUND

Input fields in a user interface associated any business process management (BPM) workflow application are a place for users to enter content in the form of text. Depending on the application, the content entered by the user into each field is typically stored, capable of being reproduced on demand. It is not uncommon for the content displayed on some of the fields to include private information that may be accessible only by authorized users. If a user does not have the requisite authorization access the user interface, fields that include private information are pre-configured to mask associated content prior to loading the user interface for such as user. However, certain input fields are not typically configured for content masking due to the inherent nature of such fields. Sometimes, when a user is entering content into such fields, they may inadvertently include private information that are otherwise not meant to be entered therein.

Therefore, there is a need for a system for implementing real-time redaction in a workflow configurable environment.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing a real-time redaction in a workflow configurable environment is presented. The system comprising: at least one non-transitory storage device; and at least one processing device coupled to the at least one non-transitory storage device, wherein the at least one processing device is configured to: electronically receive, from a user input device, a request to load at least one user interface associated with an application; initiate a real-time content redaction engine on contents of the one or more fields associated with the at least one user interface in response to receiving the request, wherein initiating further comprises: parsing one or more embedded structures associated with the one or more fields; identifying private information in the one or more fields based on at least parsing the one or more embedded structures; and masking the private information in the one or more fields; and load the at least one user interface associated with the application in response to masking the private information in the one or more fields.

In some embodiments, the at least one processing device is further configured to: receive the request to load the at least one user interface associated with the application; and initiate an authentication protocol to determine an authorization level of the user; and initiate the real-time content redaction engine based on at least determining the authorization level of the user.

In some embodiments, initiating the authentication protocol further comprises: transmitting, via the user input device, an authentication request; receiving, via the user input device, one or more authentication credentials from the user; and determining an authorization level of the user based on at least the one or more authentication credentials.

In some embodiments, the at least one processing device is further configured to: determine that the content of the one or more fields comprises private information and public information; identify the private information in the one or more fields based on at least parsing the one or more embedded structures; and selectively masking the private information in the one or more fields, wherein masking further comprises redacting the private information while retaining the public information in its original form.

In some embodiments, identifying the private information further comprises: crawling a configurable database associated with the workflow configurable environment, wherein the configurable database comprises at least one or more parameters associated with identification of private information; retrieving one or more parameters associated with the contents of the one or more fields associated with the at least one user interface; determining a match between the one or more parameters associated with the identification of private information and the one or more parameters associated with the contents of the one or more fields; identifying the private information based on at least the match.

In some embodiments, the at least one processing device is further configured to: electronically receive, from the user input device, one or more additional parameters associated with the identification of private information; and update the configurable database with the one or more additional parameters associated with the identification of private information.

In some embodiments, the application is associated with a business process management workflow.

In another aspect, a computer program product for implementing real-time redaction in a workflow configurable environment is presented. The computer program product comprising a non-transitory computer-readable medium comprising code causing a first apparatus to: electronically receive, from a user input device, a request to load at least one user interface associated with an application; initiate a real-time content redaction engine on contents of the one or more fields associated with the at least one user interface in response to receiving the request, wherein initiating further comprises: parsing one or more embedded structures associated with the one or more fields; identifying private information in the one or more fields based on at least parsing the one or more embedded structures; and masking the private information in the one or more fields; and load the at least one user interface associated with the application in response to masking the private information in the one or more fields.

In yet another aspect, a method for implementing real-time redaction in a workflow configurable environment is presented. The method comprising: electronically receiving, from a user input device, a request to load at least one user interface associated with an application; initiating a real-time content redaction engine on contents of the one or more fields associated with the at least one user interface in response to receiving the request, wherein initiating further comprises: parsing one or more embedded structures associated with the one or more fields; identifying private information in the one or more fields based on at least parsing the one or more embedded structures; and masking the private information in the one or more fields; and loading the at least one user interface associated with the application in response to masking the private information in the one or more fields.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
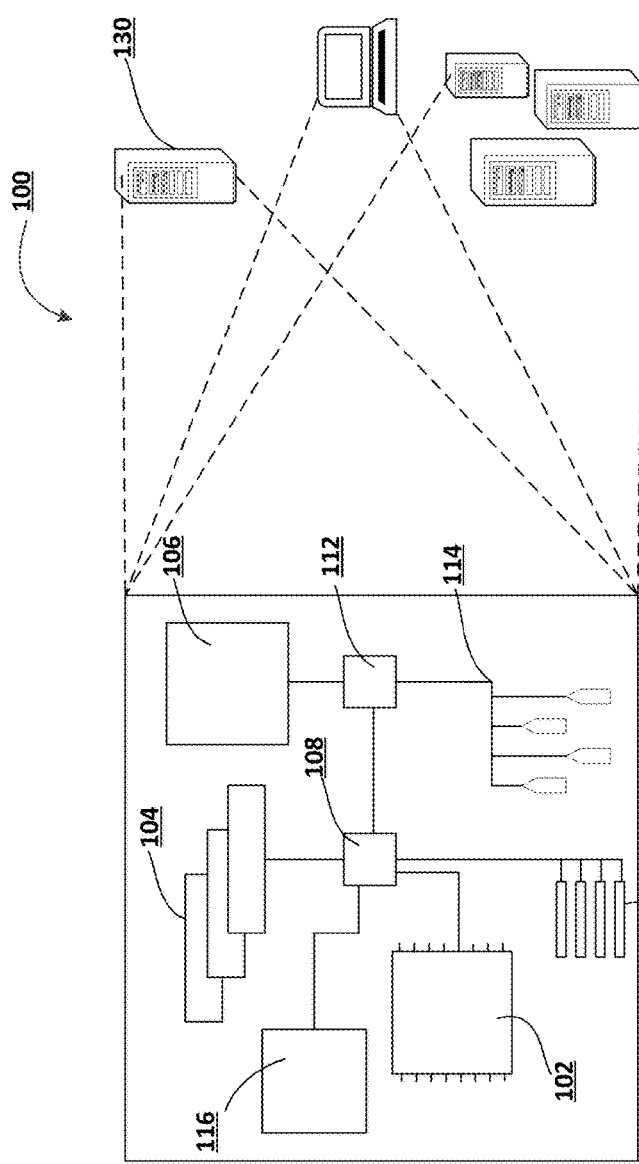
Figure 1:
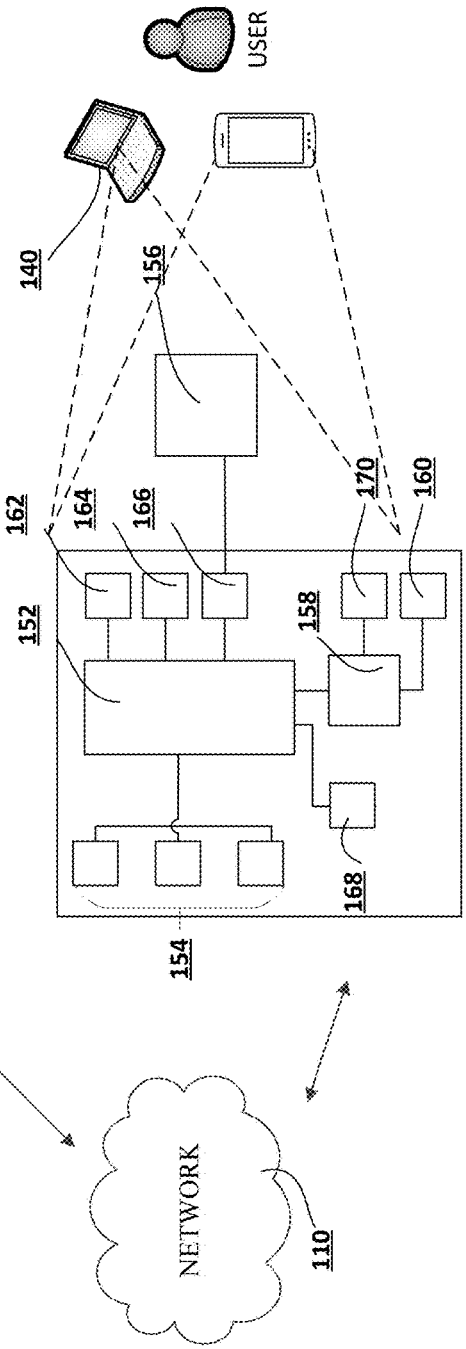
Figure 2:
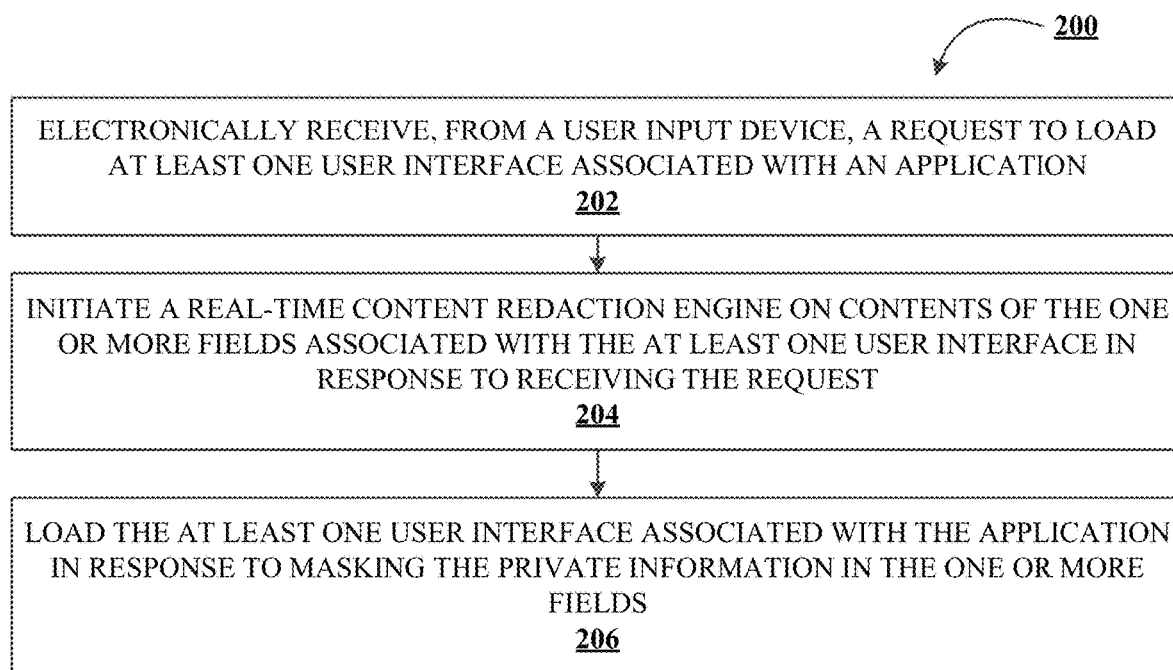
Figure 3:
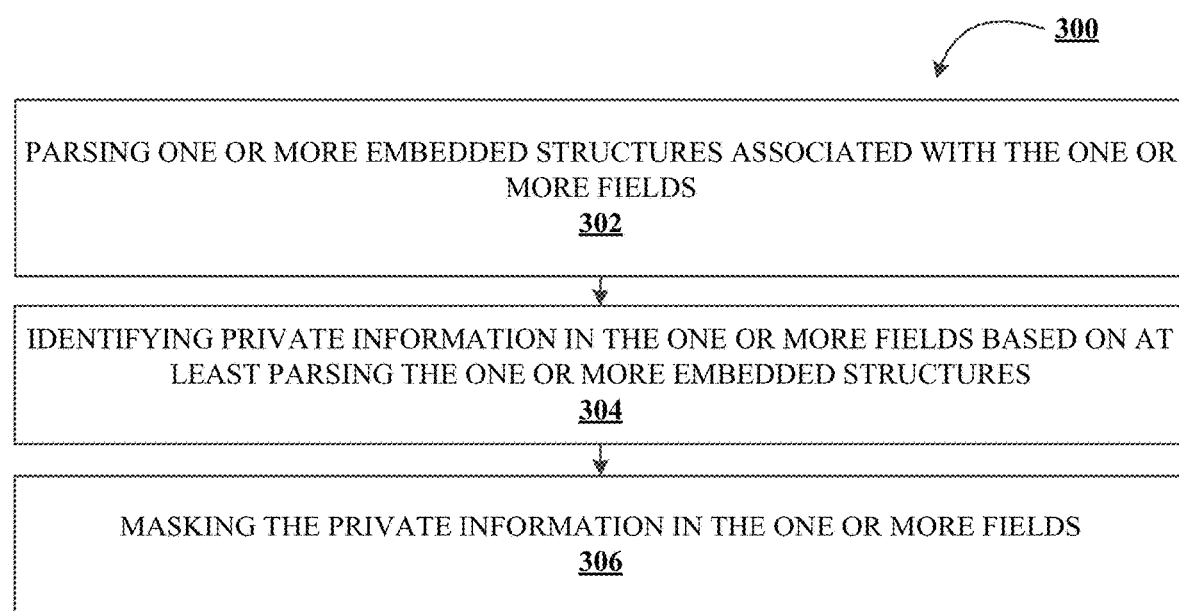

Having thus described embodiments of the invention in general terms, reference will now be made the accompanying drawings, wherein:

FIG. 1 illustrates technical components of a system for implementing real-time redaction in a workflow configurable environment, in accordance with an embodiment of the invention;

FIG. 2 illustrates a process flow for implementing real-time redaction in a workflow configurable environment, in accordance with an embodiment of the invention; and FIG. 3 illustrates a process flow for initiating a real-time redaction engine, in accordance with an embodiment of the invention.

DETAILED DESCRIPTION OF EMBODIMENTS
OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority, or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein "operatively coupled," may mean that the components may be formed integrally with each other or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "masking" or "redaction" may refer to the process of expunging sensitive data (e.g., private information) prior to disclosure in a way that meets established disclosure requirements applicable to the specific data disclosure occurrence. Furthermore, "masking" may refer to the process of either replacing authentic information with inauthentic information with identical structure or blacking out or removing information that is personally identifiable, sensitive, confidential, or classified. For purposes of this invention, masking and redacting may be user interchangeably.

A typical user interface in any application associated with a business process management (BPM) workflow may include a number of fields such as input controls, navigation components, informational components, containers and/or the like. Typically, the input fields are a place for users to enter content into the application in the form of text. Depending on the application, the content entered by the user into each field is typically stored, capable of being reproduced when requested at any time during the BPM workflow. It is not uncommon for such applications to be used by multiple users with varying authorization levels, with associated user interfaces being accessible on-demand. In a number of cases, the content displayed on some of the fields may include private information that may be accessible only by authorized users. If a user does not have the requisite authorization access the user interface, fields that include private information are pre-configured to mask associated content prior to loading the user interface for such a user. However, fields such as "comments" or "notes" are not typically configured for content masking due to the inherent nature of such fields. Sometimes, when a user is entering content into such fields, they may inadvertently include private information that are otherwise not meant to be entered therein.

The present invention provides the functional benefit of implementing real-time redaction on content entered into such fields by specifically targeting the private information among other public information and masking the targeted private information while unaltering the public information. In doing so, the present invention determines, in real-time, whether the user who has requested access to the user interface has the requisite authorization to access such private information and masks only the specific subset of private information that the user is unauthorized to access. For example, a user with higher authorization level may have fewer private information masked while a user with lower authorization level may have more private information masked. Therefore, the masked content may be displayed differently to different users based on their authorization level. Furthermore, the present invention is application agnostic and may be layered over any application regardless of its version.

FIG. 1 presents an exemplary block diagram of the system environment for implementing real-time redaction in a workflow configurable environment 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input device 140. In some embodiments, the system 130, and the user input device 140 may be used to implement the processes described herein, in accordance with an embodiment of the present invention. In this regard, the system 130 and/or the user input device 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, servers, wearable devices, Internet-of-things devices, electronic kiosk devices (e.g., automated teller machine devices), blade servers, mainframes, or any combination of the aforementioned. In accordance with embodiments of the invention, the user input device 140 is intended to represent various forms of mobile devices, such as personal digital assistants, cellular telephones, smartphones, augmented reality (AR) devices, virtual reality (VR) devices, extended reality (XR) devices, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input device 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input device 140, in accordance with an embodiment of the invention. The user input device 140 includes a processor 152, memory 154, an input/output device such as a display 156, a communication interface 158, and a transceiver 160, among other components. The user input device 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input device 140, including instructions stored in the memory 154. The processor may be implemented as a chipset of chips that include separate and multiple analog and digital processors. The processor may be configured to provide, for example, for coordination of the other components of the user input device 140, such as control of user interfaces, applications run by user input device 140, and wireless communication by user input device 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input device 140 with other devices. External interface 168 may provide, for example, for wired communication in some implementations, or for wireless communication in other implementations, and multiple interfaces may also be used.

The memory 154 stores information within the user input device 140. The memory 154 can be implemented as one or more of a computer-readable medium or media, a volatile memory unit or units, or a non-volatile memory unit or units. Expansion memory may also be provided and connected to user input device 140 through an expansion interface (not shown), which may include, for example, a SIMM (Single In Line Memory Module) card interface. Such expansion memory may provide extra storage space for user input device 140 or may also store applications or other information therein. In some embodiments, expansion memory may include instructions to carry out or supplement the processes described above and may include secure information also. For example, expansion memory may be provided as a security module for user input device 140 and may be programmed with instructions that permit secure use of user input device 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input device 140 to transmit and/or receive information or commands to and from the system 130 via the network 110. Any communication between the system 130 and the user input device 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input device 140 (or any other computing devices) may provide the system 130 with permissioned to access the protected resources of the user input device 130 (or any other computing devices), which may include a GPS device, an image capturing component (e.g., camera), a microphone, a speaker, and/or any of the components described herein.

The user input device 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input device 140, which may be used as appropriate by applications running thereon, and in some embodiments, one or more applications operating on the system 130.

The user input device 140 may also communicate audibly using audio codec 162, which may receive spoken information from a user and convert it to usable digital information. Audio codec 162 may likewise generate audible sound for a user, such as through a speaker, e.g., in a handset of user input device 140. Such sound may include sound from voice telephone calls, may include recorded sound (e.g., voice messages, music files, etc.) and may also include sound generated by one or more applications operating on the user input device 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, ▓dback provided to the user can be any form of sensory ▓back (e.g., visual ▓dback, auditory ▓dback, or tactile ▓dback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input device 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input device 140 may have a client-server relationship, where the user input device 130 makes a service request to the system 130, the system 130 accepts the service request, processes the service request, and returns the requested information to the user input device 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some, or all of the portions of the system 130 may be separated into two or more distinct portions.

FIG. 2 illustrates a process flow for implementing real-time redaction in a workflow configurable environment 200, in accordance with an embodiment of the invention. As shown in block 202, the process flow includes electronically receiving, from a user input device, a request to load at least one user interface associated with an application. In some embodiments, in response to receiving the request to load the at least one user interface, the system may be configured to initiate an authentication protocol to determine an authorization level of the user. As described herein, authorization is the rights and permissions granted to the that enables access to a computing resource (e.g., user interface of an application). Once the user has been properly identified and authenticated, authorization levels determine the extent of application rights and content that the user has access to. Therefore, to determine the authorization level of the user, the system may be configured to transmit, via the user input device, an authentication request. In response, the system may be configured to receive, via the user input device, one or more authentication credentials from the user. Based on the authentication credentials received, the system may be configured to determine an authorization level of the user. Then, the system may be configured to initiate the real-time content redaction based on at least the authorization level of the user.

Next, as shown in block 204, the process flow includes initiating a real-time content redaction engine on contents of the one or more fields associated with the at least one user interface in response to receiving the request. As described herein, the contents of the one or more fields may include both private information and public information. Private information may refer to data that must be guarded from unauthorized access and unwarranted disclosure in order to maintain the information security of an individual or organization. Public information may refer to data, regardless of form or format, that an ▓▓ncy discloses, disseminates, or makes available to the public. Here, the real-time content redaction engine may be used to mask private information identified in the one or more fields. More specifically, the real-time content redaction engine may be used to mask private information identified in the one or more fields for each user based on determining whether the user is authorized to access such information based on their individual authorization level.

Next, as shown in block 206, the process flow includes loading the at least one user interface associated with the application in response to masking the private information in the one or more fields. Once loaded, the system may be configured to transmit control signals configured to cause the user input device to display the at least one user interface with the necessary redactions.

FIG. 3 illustrates a process flow for initiating a real-time redaction engine 300, in accordance with an embodiment of the invention. As shown in block 302, the process flow includes parsing one or more embedded structures associated with the one or more fields. In some embodiments, parsing may refer to the process of analyzing a string of symbols, either in natural language, computer languages or data structures. Some fields may be configured as a rich text field having multiple embedded formatting structures that enables users to create rich text content. Parsing the embedded structures in these fields allows for more efficient means of capturing syntactic roles of content present therein.

Next, as shown in block 304, the process flow includes identifying private information in the one or more fields based on at least parsing the one or more embedded structures. In this regard, the system may be configured to crawl a configurable database associated with the workflow configurable environment. Here, the configurable database may include specific parameters associated with identification of private information. In some embodiments, the parameters may be used to define the type of private information the user may wish to have redacted. In one aspect, the parameters may include at least a specific format, a particular combination of character and numerical string, a data type, and/or the like. For example, sensitive information such as a customer account number may be defined by its specific format XXX-XX-XXXX and may be defined in the configurable database as one of the parameters.

The parameters associated with identification of private information are then compared with the contents of the fields associated with the user interface to determine a match. In this regard, the system may be configured to retrieve parameters associated with the contents of the fields associated with the user interface. This may be done by breaking down each content into its primary structure to identify individual data elements. In response, the system may be configured to determine a match between the parameters associated with the identification of private information and the parameters associated with the contents of the fields associated with the user interface. Based on the match, the system may be configured to identify the private information.

As described herein, not app private information requires redaction as the not all users that have access to the user interface have the same authorization level. Once the private information is identified, the system may then be configured to determine the access rights of the user based on the user's authorization level. These access rights define which, if any, of the private information the user is eligible to access. If the user has access to all the identified private information, no redaction is necessary. On the other hand, if the user does not have access to a subset of the private information, the system may be configured to select that specific subset of private information for masking.

Next, as shown in block 306, the process flow includes masking the private information in the one or more fields. In this regard, the system may be configured to implement a number any number of masking techniques such as substitution, shuffling, number and date variance, encryption, nulling out or deletion, and/or the like to achieve similar result. Once redacted, the at least one user interface may be loaded for display on the user input device.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for implementing real-time redaction in a workflow configurable environment, the system comprising:
    at least one processing device; and
    at least one non-transitory storage device with computer-readable program code stored thereon and accessible by the at least one processing device, wherein the computer-readable code when executed is configured to cause the at least one processing device to:
        electronically receive, from a user input device, a request to load at least one user interface associated with an application;
        run a real-time content redaction engine on contents of one or more fields associated with the at least one user interface in response to receiving the request, wherein running the real-time content redaction engine comprises:
            parsing one or more embedded structures associated with the one or more fields;
            identifying private information in the one or more fields based on at least parsing the one or more embedded structures, wherein identifying the private information comprises:
                accessing a configurable database associated with the workflow configurable environment, wherein the configurable database comprises at least one or more parameters associated with identification of private information;
                retrieving one or more parameters associated with the contents of the one or more fields associated with the at least one user interface;
                determining a match between the one or more parameters associated with the identification of private information and the one or more parameters associated with the contents of the one or more fields; and
                identifying the private information based on at least the match; and
            masking the identified private information in the one or more fields, wherein masking comprises redacting the private information; and
        load the at least one user interface associated with the application after masking the private information in the one or more fields.

2. The system of claim 1, wherein the computer-readable code when executed is configured to cause the at least one processing device to:
    receive the request to load the at least one user interface associated with the application;
    initiate an authentication protocol to determine an authorization level of the user; and
    initiate the real-time content redaction engine based on at least determining the authorization level of the user.

3. The system of claim 2, wherein initiating the authentication protocol further comprises:
    transmitting, via the user input device, an authentication request;
    receiving, via the user input device, one or more authentication credentials from the user; and
    determining an authorization level of the user based on at least the one or more authentication credentials.

4. The system of claim 1, wherein masking further comprises retaining public information in its original form.

5. The system of claim 4, wherein the computer-readable code when executed is configured to cause the at least one processing device to:
    electronically receive, from the user input device, one or more additional parameters associated with the identification of private information; and
    update the configurable database with the one or more additional parameters associated with the identification of private information.

6. The system of claim 1, wherein the application is associated with a business process management workflow.

7. A computer program product for implementing real-time redaction in a workflow configurable environment, the computer program product comprising a non-transitory computer-readable medium comprising code causing at least one processing device to:
    electronically receive, from a user input device, a request to load at least one user interface associated with an application;
    run a real-time content redaction engine on contents of one or more fields associated with the at least one user interface in response to receiving the request, wherein running the real-time content redaction engine comprises:
        parsing one or more embedded structures associated with the one or more fields;
        identifying private information in the one or more fields based on at least parsing the one or more embedded structures, wherein identifying the private information comprises:
            accessing a configurable database associated with the workflow configurable environment, wherein the configurable database comprises at least one or more parameters associated with identification of private information;
            retrieving one or more parameters associated with the contents of the one or more fields associated with the at least one user interface;
            determining a match between the one or more parameters associated with the identification of private information and the one or more parameters associated with the contents of the one or more fields; and
            identifying the private information based on at least the match; and
        masking the identified private information in the one or more fields, wherein masking comprises redacting the private information; and
    load the at least one user interface associated with the application after masking the private information in the one or more fields.

8. The computer program product of claim 7, wherein the non-transitory computer-readable medium further comprises code configured to cause the at least one processing device to:
    receive the request to load the at least one user interface associated with the application;
    initiate an authentication protocol to determine an authorization level of the user; and initiate the real-time content redaction engine based on at least determining the authorization level of the user.

9. The computer program product of claim 8, wherein initiating the authentication protocol further comprises:
   transmitting, via the user input device, an authentication request;
   receiving, via the user input device, one or more authentication credentials from the user; and
   determining an authorization level of the user based on at least the one or more authentication credentials.

10. The computer program product of claim 7, wherein masking further comprises retaining public information in its original form.

11. The computer program product of claim 10, wherein the non-transitory computer-readable medium further comprises code configured to cause the at least one processing device to:
   electronically receive, from the user input device, one or more additional parameters associated with the identification of private information; and
   update the configurable database with the one or more additional parameters associated with the identification of private information.

12. The computer program product of claim 7, wherein the application is associated with a business process management workflow.

13. A method for implementing real-time redaction in a workflow configurable environment, the method comprising:
   electronically receiving, from a user input device, a request to load at least one user interface associated with an application;
   running a real-time content redaction engine on contents of one or more fields associated with the at least one user interface in response to receiving the request, wherein running the real-time content redaction engine comprises:
      parsing one or more embedded structures associated with the one or more fields;
      identifying private information in the one or more fields based on at least parsing the one or more embedded structures, wherein identifying the private information comprises:
         accessing a configurable database associated with the workflow configurable environment, wherein the configurable database comprises at least one or more parameters associated with identification of private information;
         retrieving one or more parameters associated with the contents of the one or more fields associated with the at least one user interface;
         determining a match between the one or more parameters associated with the identification of private information and the one or more parameters associated with the contents of the one or more fields; and
         identifying the private information based on at least the match; and
      masking the identified private information in the one or more fields, wherein masking comprises redacting the private information; and
   loading the at least one user interface associated with the application after masking the private information in the one or more fields.

14. The method of claim 13, wherein the method further comprises:
   receiving the request to load the at least one user interface associated with the application;
   initiating an authentication protocol to determine an authorization level of the user; and
   initiating the real-time content redaction engine based on at least determining the authorization level of the user.

15. The method of claim 14, wherein initiating the authentication protocol further comprises:
   transmitting, via the user input device, an authentication request;
   receiving, via the user input device, one or more authentication credentials from the user; and
   determining an authorization level of the user based on at least the one or more authentication credentials.

16. The method of claim 13, wherein masking further comprises retaining public information in its original form.

17. The method of claim 16, wherein the method further comprises:
   electronically receiving, from the user input device, one or more additional parameters associated with the identification of private information; and
   updating the configurable database with the one or more additional parameters associated with the identification of private information.

* * * * *